United States Patent [19]

Biggs

[11] 4,015,710

[45] Apr. 5, 1977

[54] REUSABLE SHIPPING CONTAINER ASSEMBLY

[75] Inventor: Lester G. Biggs, Newalla, Okla.

[73] Assignee: The United States of America as represented by the Secretary of the Air Force, Washington, D.C.

[22] Filed: Oct. 17, 1975

[21] Appl. No.: 623,528

[52] U.S. Cl. .............................. 206/386; 108/55.5; 217/43 A; 229/23 C; 248/346
[51] Int. Cl.² ........................................ B65D 19/26
[58] Field of Search ......... 206/386, 526; 217/43 R, 217/43 A; 108/55, 55.5; 248/346

[56] References Cited

UNITED STATES PATENTS

| | | | |
|---|---|---|---|
| 2,696,360 | 12/1954 | Toffolon | 108/55 |
| 3,069,059 | 12/1962 | Desbois | 108/55 |
| 3,090,177 | 5/1963 | Budd | 206/386 |
| 3,094,211 | 6/1963 | Bender | 206/386 |
| 3,375,793 | 4/1968 | Wagner | 206/386 |
| 3,481,808 | 12/1969 | Wilkins et al. | 217/43 R |
| 3,494,535 | 2/1970 | Acker | 217/43 A |
| 3,831,744 | 8/1974 | Walden et al. | 217/43 A |
| 3,858,527 | 1/1975 | Reis | 108/55 |
| 3,880,093 | 4/1975 | Schott | 108/55 |

Primary Examiner—William Price
Assistant Examiner—Bruce H. Bernstein
Attorney, Agent, or Firm—Joseph E. Rusz; Arsen Tashjian

[57] ABSTRACT

A reusable shipping container assembly for securing, supporting, housing and shipping items. In a preferred embodiment, the container assembly includes: (a) members for securing and supporting the item, including: a slotted base upon which the item is placed; a plurality of removable straps, with fasteners, passing through any two of the slots, for strapping the item to the base; a plurality of bracing blocks, movable on the base and releasably lockable in the slots, to abut and brace the item; and a floor, removably positioned under, and also cushioned under, the base; and, (b) a completely closeable container for housing the item to be shipped, and the members of the assembly which secure and support the item to be shipped. This container assembly, unlike the prior art not only is reusable, but also permits the simultaneous housing and shipping, within the same container, or a multiplicity of items that vary in size, shape, and weight.

3 Claims, 4 Drawing Figures

REUSABLE SHIPPING CONTAINER ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates to a reusable container assembly for housing and shipping an item or a multiplicity of items.

Shipping containers as such are old, many and varied, and very well known. However, it is fair and accurate to say that there is no container, or container assembly, in the prior art which provides versitility for packaging a wide range of items of significantly different sizes, shapes, weights, and the like.

I have invented such a container assembly; and, thereby, I have materially advanced the state-of-the-art.

SUMMARY OF THE INVENTION

This invention relates to a container assembly for housing and shipping an item, or a plurality of items, of significantly different sizes, shapes, weights, and the like.

The principal object of this invention, therefore, is to teach the structure of such a container assembly.

Another object of this invention is to provide a container assembly which is reusable.

Still another object of this invention is to permit the use of an external fiberboard container and, yet, to provide the desired degree of shipping protection.

Yet another object of this invention is to allow the use of an external plywood container and skids therein, with said skids being integrated with the basic container assembly, and usable in the integrated condition after removal of the enclosing plywood container.

These objects, and other equally important and related objects, of may invention will become readily apparent after a consideration of the description of my invention and reference to the Figures of the drawing.

DESCRIPTION OF THE PREFERRED EMBODIMENT

My inventive reusable container assembly comprises, in its most basic and fundamental aspects: (a) means for securing and supporting the item that is to be housed and shipped; and (b) means for housing the securing and supporting means, and the item.

Figure 1:
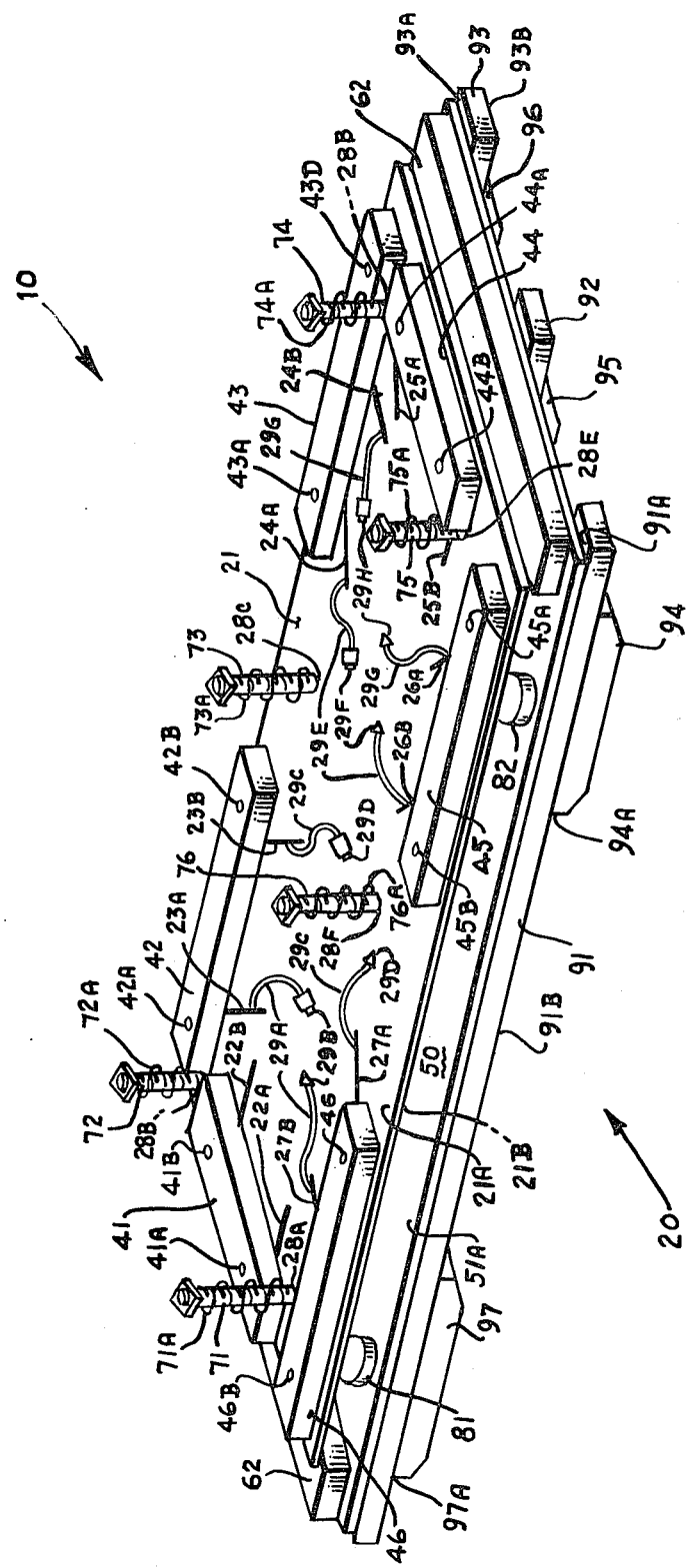
FIG. 1 is a side elevation view in perspective, of the constituent members of a preferred embodiment of my invention, less a container member thereof.

With reference to FIG. 1, therein is shown a preferred embodiment 10 of my invention, less a container member thereof. The means 20 for securing and supporting the item(s), now shown, includes: a planar base component 21 of preselected configuration, having a plurality of slots (such as representative ones 22A, 22B, 23A, 23B, 24A, 24B, 25A, 25B, 26A, 26B, 27A and 27B) therein and therethrough, and also having a plurality of holes (such as representative ones 28A, 28B, 28C, 28D, 28E and 28F) similarly therein and therethrough; and, a plurality of removable straps (such as representative ones 29A, 29C, 29E and 29G) having respective individual fasteners (such as 29B for 29A, 29D for 29C, 29F for 29E, and 29H for 29G), with each strap passing through two different base slots (e.g., strap 29A passing through base slots 23A and 27B). The securing and supporting means also includes a suitably configurated and dimensioned container, not shown in FIG. 1, that is completely closeable. However, with reference to FIG. 2, therein are shown: a completely closeable container 30, in phantom, and its partially fragmented oppositely disposed pairs of top closure panels; and, internal of the container 30, the planar base member 21, with its representative slots 22A-27F, and its representative bolt holes 28A-28F.

Figure 2:
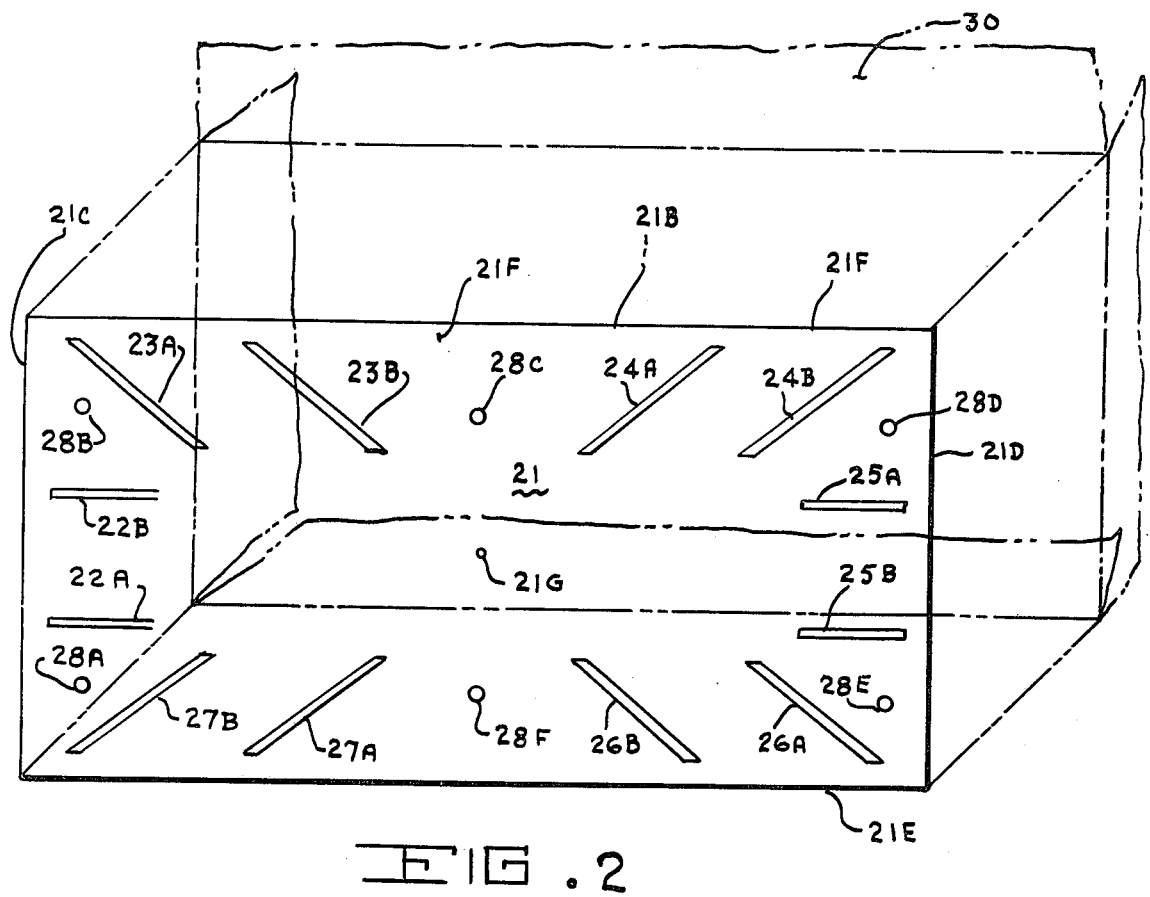
FIG. 2 is a top plan view, in simplified form, of the planar base member of the preferred embodiment, with (and internal of) a fiberboard shipping container member of the inventive assembly, with the container shown in phantom, in perspective, and partially fragmented.

With reference to both FIGS. 1 and 2, it is to be noted that planar base member 21 is, preferably and not by way of any limitation in the form of a rectangular solid having an upper surface 21A, a lower surface 21B, a first end 21C, a second end 21D, a first edge 21E, a second edge 21F, and a geometric center 21G, with the plurality of slots therein preferably comprising individual sets of two adjacent parallel slots, i.e., a first set 22A and 22B, a second set 25A and 25B, a third set 27A and 27B, a fourth set 26A and 26B, a fifth set 23A and 23B, and a sixth set 24A and 24B.

The first set of slots 22A and 22B is disposed perpendicularly to the first end 21C of the base 21, with each of these two adjacent parallel slots extending from geometric center 21G of the base 21.

The second set of slots 25A and 25B is disposed perpendicularly to the second end 21D of the base 21, with each of these two adjacent parallel slots extending from near the second end 21D of the base 21 toward the geometric center 21G of the base 21.

The third set of slots 27A and 27B, and a fourth set of slots 26A and 26B, are disposed, respectively, in a coverging slanted position from near the first edge 21E of the base 21 toward the geometric center 21G of the base 21.

The fifth set of slots 23A and 23B, and the sixth set of slots 24A and 24B, are disposed, respectively, in a converging slanted position from near the second edge 21F of the base 21 toward the geometric center 21G of the base.

It is to be noted: that base 21, with the straps and individual fasteners (such as representative strap 29A with fasteners 29B) passing through two different base slots, could be used per se to secure and support a light item to be shipped; and, that in that situation the base with the strps, the fasteners, and the secured and supported item could be placed internal of the container 30 and can be, in fact, safely and effectively housed and shipped.

As a related matter, it is preferred that the base 21 be made of plywood, and that the straps (such as 29A, 29C, 29E and 29G) be made of nylon webbing.

If in fact, the light item is to be housed and shipped using the base 22, the straps (such as 29A), and the external, completely closeable container, such as 30, then the container 30 may be made either of fiberboard or of plywood.

Figure 4:
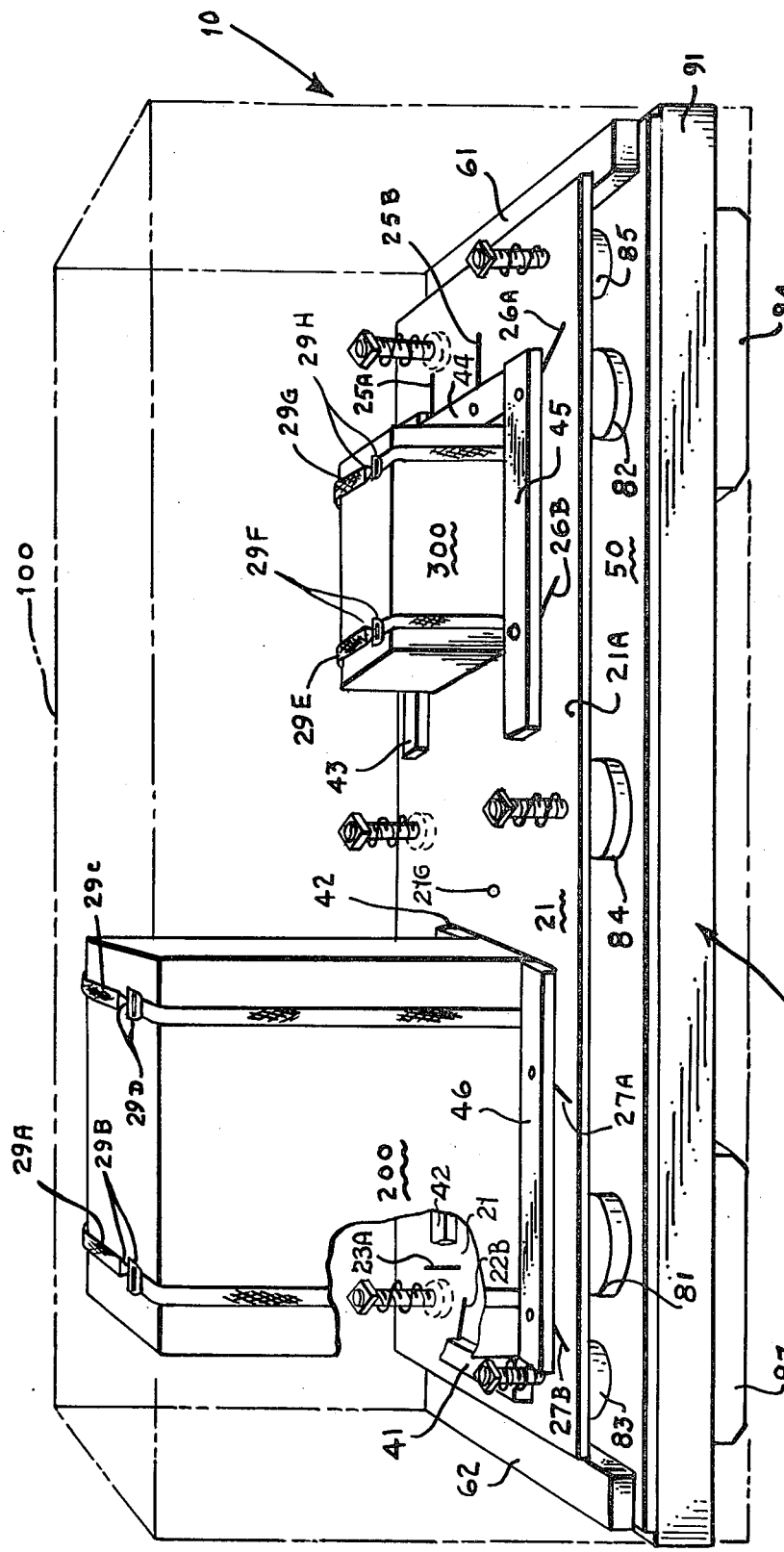
FIG. 4 is a side elevation view, in perspective, of the preferred embodiment of my invention, with the container thereof in phantom, shown in use ready for shipping two items internal of the container, with the two items varying in size and weight, but nevertheless safely and effectively secured and supported, including shifting relative to each other.

If, on the other hand, a heavy item (or a plurality of items which collectively are heavy) is to be housed and shipped, then the container assembly shown in FIG. 1 and 4 preferably should be used. That sturdier and stronger container comprises, as can be easily seen, more consituent members. Additionally, the container, FIG. 4, is made of plywood. In other words, a fiberboard container, such as 30 may be, is not used.

Figure 3:
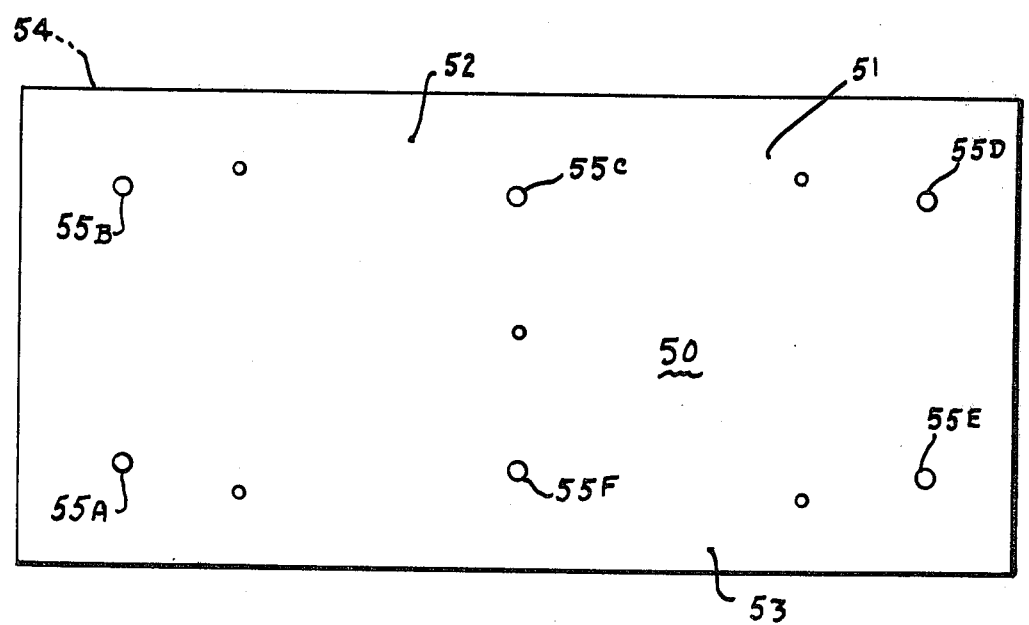
FIG. 3 is a top plan view of the planar floor memeber of the preferred embodiment.

With reference to FIGS. 1, 2 and 3, the sturdier container assembly further includes: a plurality, preferably six, of bracing blocks, such as 41, 42, 43, 44, 45 and 46, with each bracing block removably attached to base 21 at two different slots (preferably a set), such as bracing block 41 to first set of slots 22A and 22B; a planar floor component 50, of preselected configuration similar to, and of larger dimensions than, the base 21, and with the floor 50 having a forward portion 51, an aft portion 52, a top surface 53, a bottom surface 54, and a plurality of floor holes, such as 55A, 55B, 55C, 55D, 55E and 55F, with the floor holes in vertical alignment with the base holes, and thereby forming a plurality of matched sets of vertically aligned, spaced-apart holes, consisting of one base hole and one floor hole, i.e., 28A and 55A, 28B and 55B, 28C and 55C, 28D and 55D, 28E and 55E, and 28F and 55F; a first header member 61 attached to the top surface 53 of the floor member 50 at the forward portion 51 thereof; a second header member 62 attached to the top surface 53 of the floor member 50 at the aft portion 52 thereof; a plurality of bolts, such as 71, 72, 73, 74, 75 and 76, one bolt for each one of the plurality of matched sets of holes formed by the base and the floor, e.g., bolt 71 for matched set of holes 28A and 55A, with each bolt passing through a different one of the plurality of matched sets of holes; a first plurality of cushioning members, such as 81 and 82, disposed between and abutting with, the lower surface 21B of the base 21 and the top surface 53 of the floor 50; a second plurality of cushioning members, such as 83, 84 and 85, FIG. 4, one such member for each of the plurality of bolts, such as 83 for bolt 71, 84 for bolt 76, and 85 for bolt 75, with each cushioning member encircling its respective bolt and simultaneously also disposed betweem and abutting with, the lower surface 21B of the base 21 and the top surface 53 of the floor 50; a plurality of relief springs, such as 71A, 72A, 73A, 74A, 75A and 76A, with one relief spring for each bolt, such as relief spring 71A for bolt 71, with each relief spring disposed on and encircling its respective bolt, and with each relief spring having two ends, with one end abutting the upper surface 21A of the base and with the other end restrained, with each spring thereby held captive; a plurality of skids, such as 91, 92 and 93, with each skid, such as 91, having a top surface, such as 91A and a bottom surface 91B, and with each skid attached by its top surface, such as 93A, to the bottom surface 54 of the floor 50; and, a plurality of rubbing strips, such as 94, 95, 96 and 97, with each having a top surface, such as 94A for 94, and with at least two of the rubbing strips, such as 94 and 97, attached by their respective top surfaces, such as 94A and 97A, to the bottom surface, such as 91B, of a different one of each of the skids, such as 91, of the plurality of skids.

Returning to FIGS. 1 and 2, the bracing blocks (i.e., first block 41, second block 42, third block 43, fourth block 44, fifth block 45, and sixth block 46) are disposed on the upper surface 21A of base member 21 and are, as previously stated, removably attached to any two different slots in the base. However, as a matter of preference the bracing blocks are suitably configurated and dimensioned, and are disposed so that each block is slideable in and along two adjacent parallel slots, as follows: the first bracing block 41 in and along first set of slots 22A and 22B; the second bracing block 42 in and along fifth set of slots 23A and 23B; the third bracing block 43 in and along sixth set of slots 24A and 24B; the fourth bracing block 44 in and along second set of slots 25A and 25B; the fifth bracing block 45 in and along fourth set of slots 26A and 26B; and, the sixth bracing block 46 in and along the third set of slots 27A and 27B.

Now, with reference to FIG. 4, therein is shown the preferred embodiment 10 of my inventive reusable container assembly, as structured for housing and shipping a heavy item, or a plurality of items which together form a heavy load and are of different sizes and dimensions. More specifically, different items 200 and 300 are shown strapped down with the use of straps 29A, 29C, 29E and 29G and fasteners thereof 29B, 29D, 29F and 29H, and braced by bracing blocks 41, 42 and 46 (for item 200) and 43, 44, and 45 (for item 300), with the blocks disposed in and along the approriate slots on the upper surface 21A of base 21 and toward the base geometric center 21G, so that the bracing blocks abut their respective items. Of course the blocks are removably attached to the base, and are also releasably locked in their respective desired positions, by suitable means, such as bolts and nuts (i.e., 41A and 41B for block 41; 42A and 42B for block 42; 46A and 46B for block 46; 43A and 43B for block 43; 44A and 44B for block 44; and, 45A and 45B for block 45).

Shown in phantom is reusable container 100 which is completely closeable; houses the securing and supporting means 20 of the preferred embodiment 10; houses the items 200 and 300 to be shipped; and preferably, is made of plywood.

It is here to be noted that: the bracing blocks, such as 41, are preferably made of wood; the floor 50 is preferably made of plywood; the header members, such as 61, are preferably made of wood; the cushioning members, both of the first and of the second plurality, such as 81 and 85, are preferably made of polyethylene; the skids, such as 91, are preferably made of wood; and, the rubbing strips, such as 97, are preferably made of wood.

MANNER OF OPERATION AND OF USE OF THE PREFERRED EMBODIMENT

The manner of cooperative association between the constituent members of the prefereed embodiment, and the manner of use of the preferred embodiment, can be very easily ascertained and understood from the foregoing description, coupled with reference to FIGS. 1–4, inclusive.

For those not in the art, the following short description will serve the purpose.

As a preliminary matter, it is to be understood that whenever the term "the item" is used, said term may be substituted therefor by the plural thereof, i.e., "the terms".

If the item to be housed and shipped is light in weight, it may be safely and effectively housed and shipped by using base 21 with the appropriate straps, such as 29A and 29B, through the suitable base slots, such as 27B and 23A for strap 29A and 27A and 23B for strap 29C, and completely closeable container 30, FIG. 2, without the need of using any of the other members of the preferred embodiment 10 of my invention. In such a situation, the item is strapped down on base 21 (and, thereby, is safely secured and supported for shipment) by use of the appropriate straps and fasteners thereof; the strapped down item, the base and the tightened straps are placed within the container; and, the container is then completely closed. Thereby, the item is housed and can be safely and effectively shipped. It is here reiterated that, depending upon the circumstances, the container 30 can be made either of fiberboard or of plywood.

On the other hand, if the item to be housed and shipped is heavy, then many of the componenet members of the preferred embodiment may, or should be used. In such a situation, such as is shown in FIG. 4, the procedure is typically and essentially as follows. The item to be housed and shipped is strapped down on base 21; the bracing blocks 41-46, as applicable, are moved within and along the appropriate base slots, such as 22A-27B, until the bracing blocks abut the item, and the releasable locking means, such as 41A-46B are positioned in the locked condition (i.e., the nuts and bolts are tightened); the integrated securing and supporting means 20, and the strapped down item, are placed within container 100; and, the container 100 is them completely closed. The container assembly 10, with the item therein, is now ready for shipment.

With reference to FIG. 4, the items 200 and 300 are secured by use of the straps and fasteners, and the bracing blocks, all of which also assist in supporting the items. The items are principally supported by the base, the floor, the cushioning members therebetween, and the bolts with their relief springs, which collectively urge the base downwardly, and assist in keeping it down. The items are also incidentally supported by the skids and their rubbing skids, the principal function of which is to permit easier handling (such as by forklift or by pushing) of the integrated securing and supporting means 20 (with the strapped down and braced item on it), after the opening and removal of the external container 100 at the place os destination of the shipped container assembly containing the payload.

CONCLUSION

It is clearly evident from the foregoing description, coupled with the Figures of the drawings, that all of the objects of my invention have been attained.

Additionally, while there have been shown and described the fundamental features of my invention, as applied to a particular and preferred embodiment, it is to be understood that various substitutions, additions, omissions, and the like, can be made by those of ordinary skill in the art without departing from the spirit of my invention. For example, my preferred embodiment can be adapted for use in the long range storage of items of various sizes and weights, in other than their normal positon and attitude (e.g., inverted or obliquely), simply by securing, supporting and housing the items in a multiplicity of units of my preferred embodiment, so that the units can then be stacked and stored in modular fashion.

What is claimed is:

1. A reusable container assembly for housing and shipping an item, comprising:
    a. means for securing and supporting the item, wherein said means includes:
        1. a planar base component, of preselected configuration, made of wood and having a plurality of slots therein and therethrough, and also having a plurality of holes therein and therethrough;
        2. a plurality of adjustable and removable straps made of nylon and having fasteners, with each said strap passing through two different slots of said plurality of base slots;
        3. a plurality of bracing blocks, with each said bracing block removably attached to said base at two different slots of said plurality of base slots;
        4. a planar floor component, of preselected configuration similar to, and of larger dimensions, than, said base, with said floor having a forward portion, an aft portion, a top surface, a bottom surface, and a plurality of holes therein and therethrough, and with said floor disposed under said base, with said plurality of floor holes in vertical alignment with said purality of base holes, thereby forming a plurality of matched sets of vertically aligned, spacedapart holes, consisting of one base hole and one floor hole;
        5. first header member attached to the top surface of said floor at the forward portion thereof;
        6. a second header member attached to the top surface of said floor at the aft portion thereof;
        7. a plurality of bolts, one bolt for each of said plurality of matched sets of holes formed by said base and said floor, with each said bolt passing through a different one of said plurality of matched sets of holes; 8. a first plurality of cushioning members disposed between, and abutting with, said base and said top surface of said floor;
        9. a second plurality of cushioning members, one for each of said plurality of bolts, with each said cushioning member of said second plurality encircling its respective bolt and simultaneously also disposed between, and abutting with, said base and said floor;
        10. a plurality of relief springs, one relief spring for each of said plurality of bolts, with each said relief spring disposed on and encircling its respective bolt, and with each said relief spring having two ends, with one end abutting said base and with the other end restrained, whereby each said relief spring is held captive;
        11. a plurality of skids, with each skid of said plurality having a top surface and a bottom surface, and with each said skid attached by its top surface to said bottom surface of said floor;
        12. and, a plurality of rubbing strips, with each rubbing strip of said plurality having a top surface, and with at least two of said rubbing strips of said plurality attached by their respective top surfaces to said bottom surface of a different one of each said skid of said plurality of skids;
    b. and, means for housing said means for securing and supporting the item, and for housing the secured and supported item, wherein said housing means includes a completely closeable container made of fiberboard.

2. A reusable container assembly for housing and shipping an item, as set forth in claim 1 wherein:
  a. said base is in the form of a rectangular solid having an upper surface, a lower surface, a first end, a second end, a first edge, a second edge, and a geometric center, with said plurality of slots therein and therethrough comprising a first, a second, a third, a fourth, a fifth, and a sixth set of two adjacent parallel slots, wherein:
    1. said first set of slots is disposed perpendicularly to said first end of said base, with each of said two adjacent parallel slots extending from near said first end of said base toward said geometric center of said base;
    2. said second set of slots is disposed perpendicularly to said second end of said base, with each of said two adjacent parallel slots extending from near said second end of said base toward said geometric center of said base;
    3. with said third set and said fourth set of slots disposed respectively in a converging slanted position from near said first edge of said base toward said geometric center of said base;
    4. and, with said fifth set and said sixth set of slots disposed respectively in a converging slanted position from near said second edge of said base toward said geometric center of said base;
  b. and, said plurality of bracing blocks comprises a first, a second, a third, a fourth, a fifth, and a sixth bracing block, wherein:
    1. said first bracing block is removably attached to said first set of slots, with said first bracing block slideable, on the upper surface of said base, and in and along said two adjacent parallel slots of said first set of slots;
    2. said second bracing block is removably attached to said fifth set of slots, with said second bracing block slideable in and along said two adjacent parallel slots of said fifth set of slots;
    3. said third bracing block is removably attached to said third set of slots, with said third bracing block slideable in and along said third set of slots;
    4. said fourth bracing block is removably attached to said fourth set of slots, with said fourth bracing block slideably in and along fourth set of slots;
    5. said fifth bracing block is removably attached to said fifth set of slots, with said fifth bracing block slideable in and along said fourth set of slots;
    6. and, said sixth bracinb block is removeably attached to said sixth set of slots, with said sixth bracing block slideable in and along said sixth set of slots.

3. A reusable container assembly for housing and shipping an item, as set forth in claim 2, wherein said bracing blocks are made of wood, said floor is made of plywood, said first and second header members are made of wood, said cushioning members of said first and second pluralities are made of polyethylene, said skids are made of wood, and said rubbing strips are made of wood.

* * * * *